…

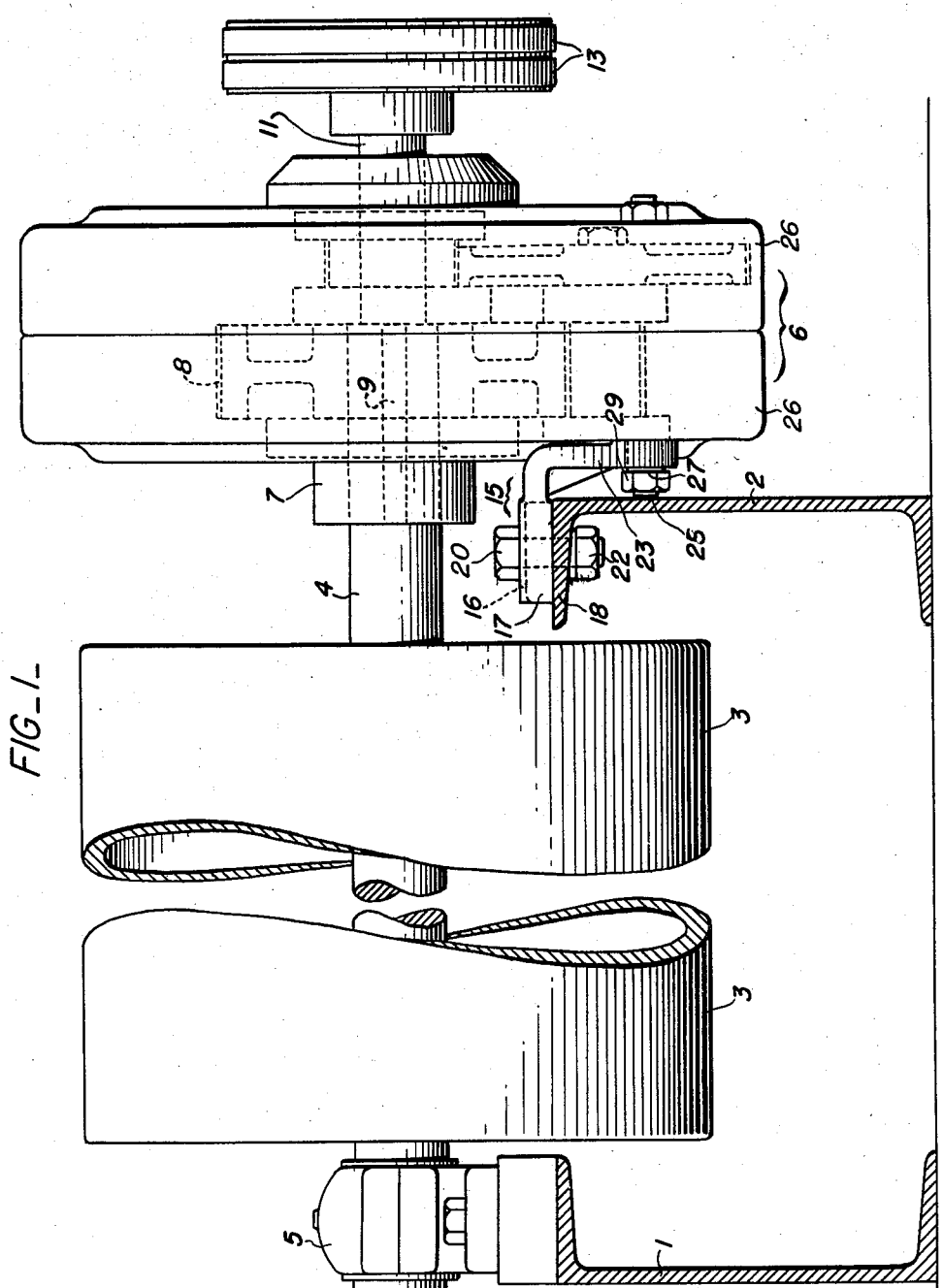

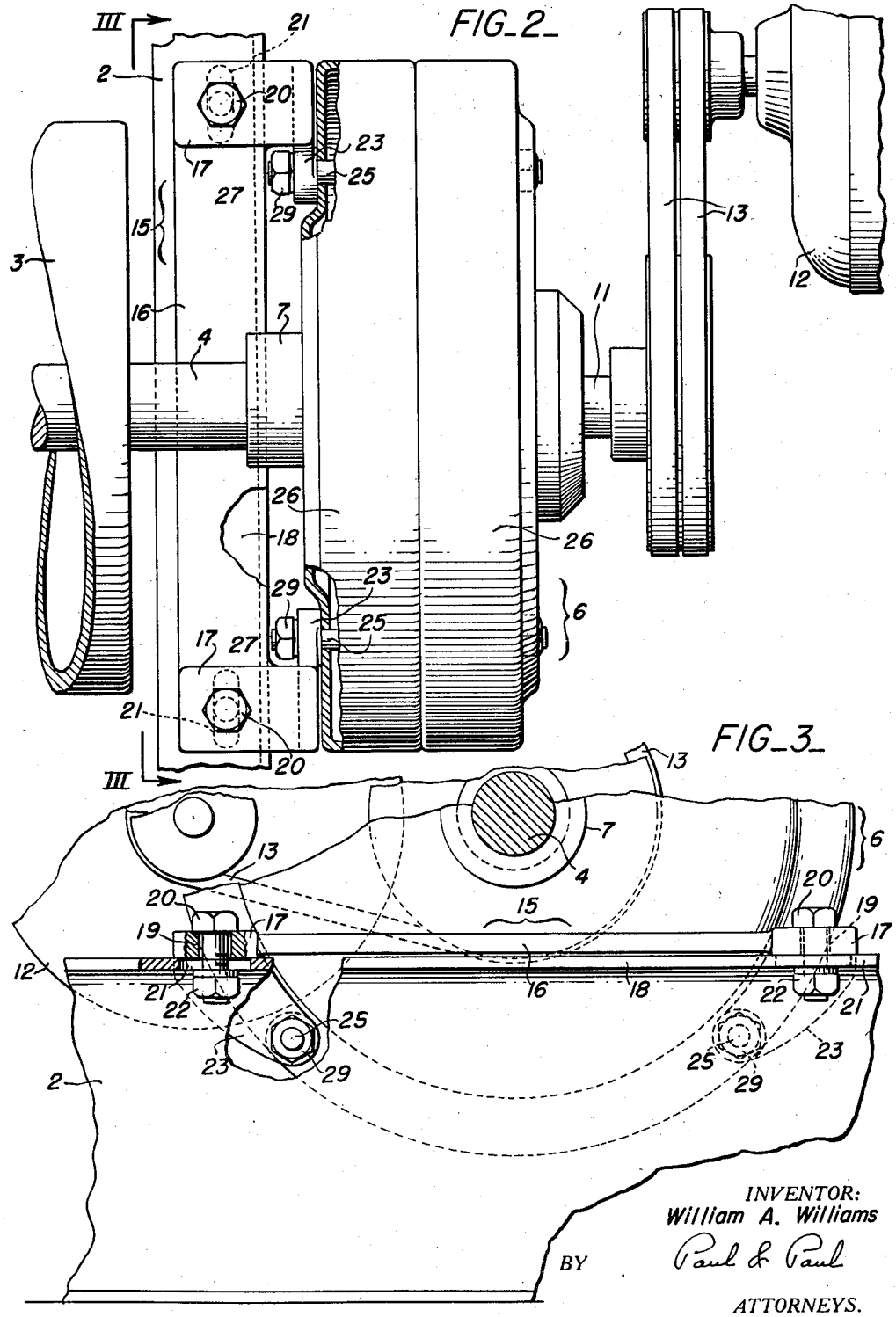

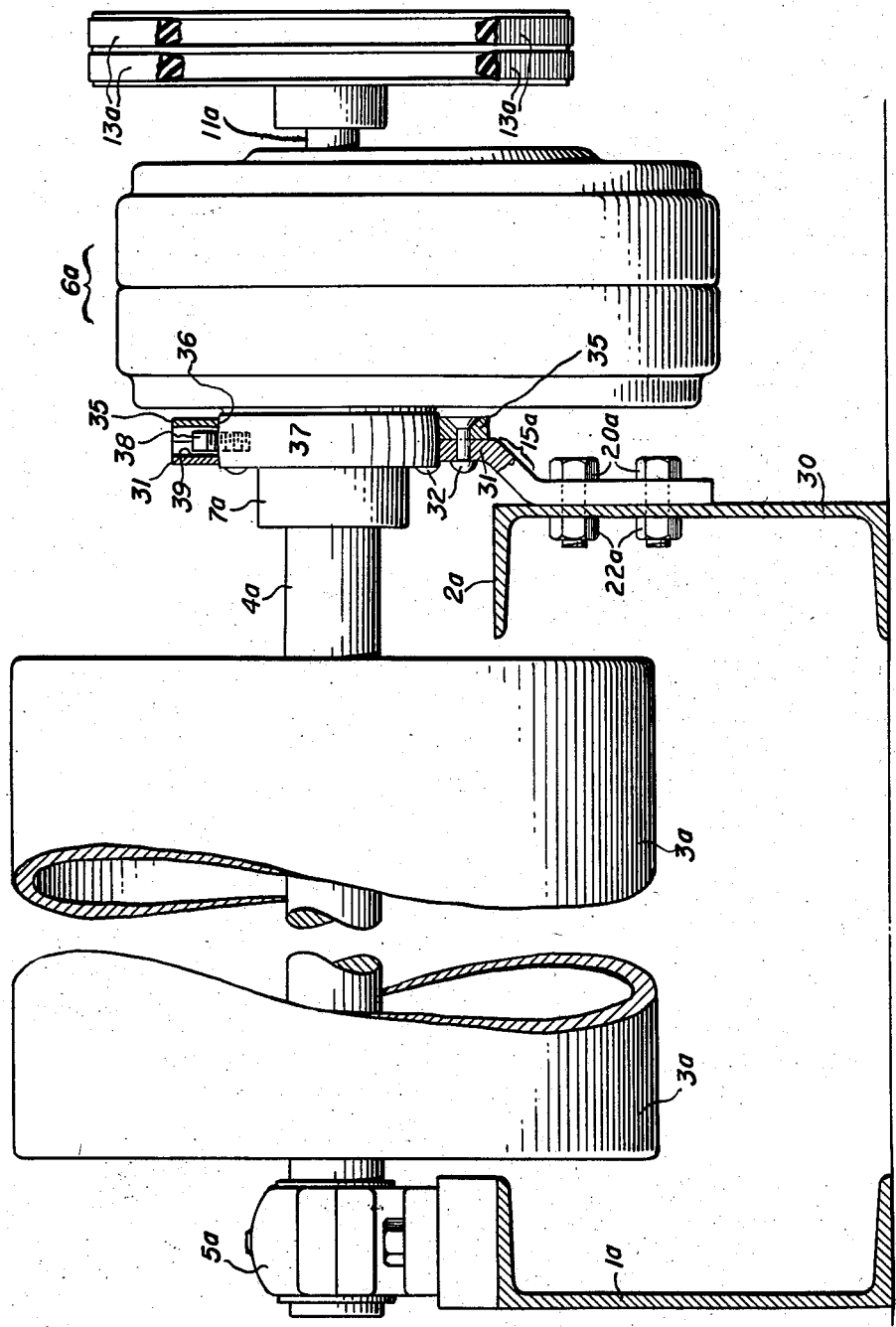

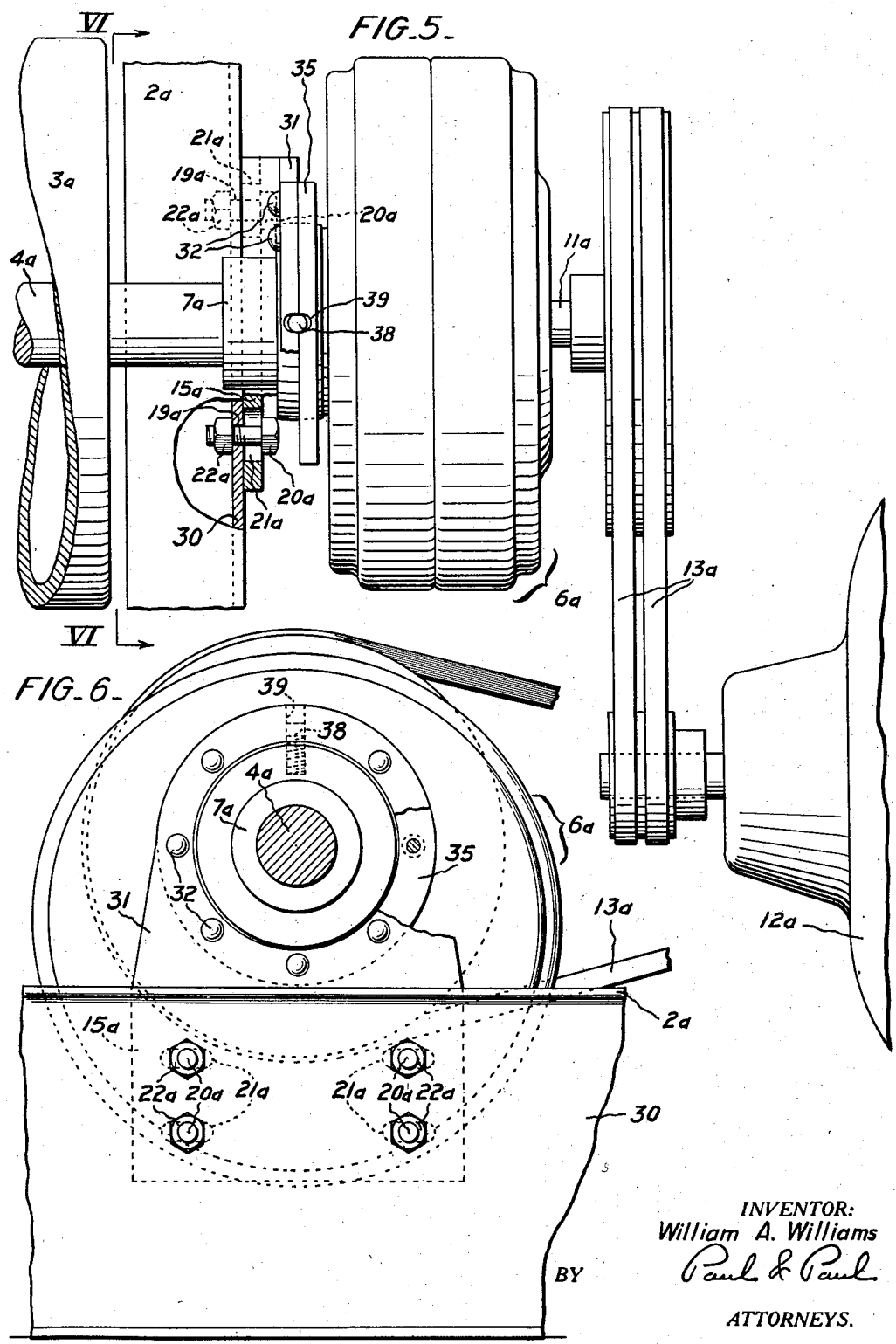

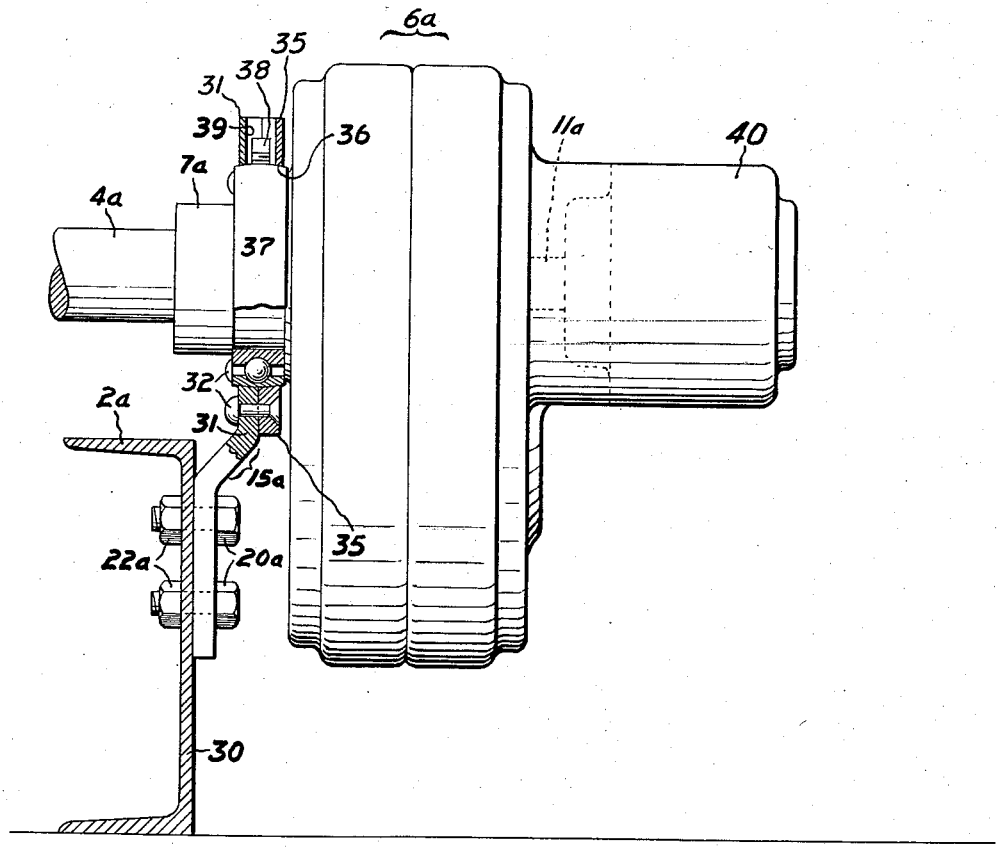

United States Patent Office 2,882,739
Patented Apr. 21, 1959

2,882,739

SPEED CHANGE TRANSMISSION DEVICES AND SUPPORTS THEREFOR

William A. Williams, Philadelphia, Pa., assignor to The American Pulley Company, Philadelphia, Pa., a corporation of Pennsylvania Application October 19, 1950, Serial No. 190,934

12 Claims. (Cl. 74—421)

This invention relates to speed change transmission devices and supports therefor. More particularly it is concerned with speed change transmission devices of the type disclosed in U.S. Patent No. 2,116,166, granted to Joseph D. Christian on May 3, 1938, adapted to be applied to one end of the shaft of a machine or apparatus which is to be driven, and characterized by having a casing with gears therein connecting a tubular output shaft to an input shaft which latter extends through one side of the casing, and which is powered either by a pulley belt from an external power source, or by a motor incorporated in the unit, and a coaxial output shaft extending through one side wall of the casing for direct connection to the shaft of the machine or apparatus. When mounted, the device of the patent is supported upon one end of the shaft of the machine or apparatus outwardly beyond the bearing in which said end is journalled. Due to the weight of the device so mounted, cantilever fashion, the outboard end of the machine shaft sharply is flexed and thus tends to bind in its bearing, this condition being most pronounced when a device of the belt-powered type is employed due to the added lateral pull of the belt. Moreover with the patented device, a torque resisting arm is necessary to prevent its bodily rotation about the machine shaft, said arm requiring for its accommodation, considerable space which was not always readily available.

My invention has for its chief aim to overcome the above mentioned drawbacks. This objective is realized, as hereinafter more fully disclosed, through improved construction of the device itself and further through provision of a bracket by which it is supported in such manner as to serve in lieu of the usual bearing for the end of the machine shaft, and to allow limited play of the shaft to compensate for any flexure occasioned therein. Moreover, in accordance with my invention, a means is provided whereby the bracket is secured to the frame of the machine or apparatus with capacity for adjustment to properly align the shaft initially, and also a means whereby the unit is held against bodily rotation without the need for a torque resisting arm or any other supplemental restraining means.

Other objects and attendant advantages will appear from the following detailed description of the attached drawings, wherein:

Fig. 1 is a broken out view in transverse section of a machine or apparatus in the form of a belt conveyer with the speed change device mounted in accordance with my invention.

Fig. 2 is a broken out fragmentary view showing the organization of Fig. 1 in top plan.

Fig. 3 is a fragmentary sectional view taken as indicated by the angled arrows III—III in Fig. 2.

Figs. 4 and 5 are views like Figs. 1 and 2 showing an alternative embodiment of the invention; and Fig. 6 is a sectional view taken as indicated by the angled arrows VI—VI in Fig. 5.

Fig. 7 is a view in side elevation similar to the right hand end of Fig. 4 of the drawings, showing a modified form of the invention wherein an electric motor is incorporated into the speed change device.

With more specific reference, first more particularly to Figs. 1–3 of these illustrations, the numerals 1 and 2 designate the stationary side frame longitudinals of a belt conveyer structure, one of the belt drums of the apparatus being indicated at 3. One end of the drum shaft 4 is journalled in a conventional bearing block 5 bolted fast to the top flange of channel 1. Connected to the opposite end of the shaft 4 is the powered speed change device whereof the gears are enclosed in an oil tight casing. After common practice in connecting such units, the protruding end of the tubular output shaft 7 carrying the gear 8, is engaged over the drive end of the conveyer pulley shaft 4 and secured to the latter by a key 9. The input shaft 11 of the device 6 is coaxial with the output shaft 7 and may be powered, by an incorporated electric motor, or from a detached motor 12 as shown, through a double belt 13.

In lieu of the usual bearing block for the drive end of the conveyer belt pulley shaft 4, I have devised, in accordance with my invention, a bracket 15 by which the device 6 is supported from the channel rail 2, with the end of said shaft rotatively sustained solely as a consequence of its connection to the output shaft 7 of the device. The bracket 15 has a bar portion 16 with pads 17 at opposite ends thereof to rest on the top flange 18 of the channel rail 2. As shown, the pads 17 are apertured as at 19 for passage of the shanks of headed securing bolts 20 which extend down through pre-allocated longitudinal slots 21 in the lateral flange of the rail, and which are tightened by nuts 22. Pendent from the opposite ends of the bar portion 16 of bracket 15 are laterally-offset arcuate hanger lugs 23 which extend toward each other and which are apertured for passage through them of lateral stud projections 25 on the casing of the unit, which in the present instance are shown as being the prolonged shank ends of certain of the screw bolts by which the complemental half sections 26 of the casing of the device are held together. The shank ends of the bolts 25 have a loose fit in the lugs 23, and are provided with stop shoulders 27 for abutment of the nuts 29.

By virtue of this construction and arrangement, it will be seen that the belt pulley shaft 11 and the device 6 can be accurately aligned in the bearing block 5 initially, and moreover that the device 6 is supported with capacity for limited movement to effectively compensate for any shaft deflection due to the overhang weight of the device or occasioned by the pull of the drive belts 13. It will be further noted that the bracket 15 holds the reduction unit 6 against revolving bodily about the shaft 4 in either direction, and thus precludes the need for a torque arm or other restraining means such as heretofore required to prevent such rotation.

In the alternative embodiment of my invention illustrated in Figs. 4–6, the bracket 15a is in the form of a stamping of stout sheet metal, which, at the bottom, is secured to the outer face of the main vertical web 30 of the channel rail 2a by four bolts 20a. The shanks of these bolts are passed through transverse slots 21a in said bracket and also through preallocated holes 19a in said web for attachment of the nuts 22a. The upper portion 31 of the bracket 15a is outwardly offset as shown in Fig. 4, and secured against the outer face thereof by a plurality of annularly arranged rivets 32, is a plate 35. Formed jointly in the upper end 31 of the plate bracket 15a and in the plate 35 is a socket opening 36 which is semispherical in cross section; and engaged in said opening with a close working fit is a correspondingly configured head projection 37 on the inner side of the casing of the speed change device 6a through which output shaft 7a extends. The two components of the bracket meet in the transverse plane through the center of the semi-spherical head 37 on the casing of the device 6a.

With this modified construction and arrangement, as with the first described embodiment, it will be seen that the shaft 4a can be initially aligned accurately in the bearing 5a, and that the semispherical bearing connection will allow easy flexing of the shaft occasioned by the overhang weight of the device 6a and/or the pull of the belts 13a. Thus, as in the first instance, binding such as would tend to interfere with the rotation of the shaft and cause rapid wear are effectively precluded. A stud 38 threaded into the head 37 and having free play within a transverse slot 39 in the top of bracket components 31, 36 (see Figs. 4 and 5) serves here as the means to prevent bodily rotation of the device about the shaft 4a.

From Fig. 7 it will be appreciated that an electric motor 40 may be incorporated into the speed change unit 6a and connected to the input shaft 11a to drive the speed change unit. In Fig. 7, the speed change unit 7a is powered by the incorporated electric motor 40 rather than the belt 13a illustrated in Fig. 4.

Having thus described my invention, I claim:

1. In combination, a powered speed change device having a casing and output shaft extending through one side of the casing, said output shaft being constructed for rigid connection to one end of the shaft of a machine or apparatus to be driven; a supporting bracket with means for securing it to a stationary member of the machine; and means connecting the device to the bracket with capacity for limited play to compensate for flexure of the shaft of the machine or apparatus, with the device serving as the sole means for rotatively sustaining the aforesaid end of the latter shaft.

2. The invention according to claim 1, wherein the securing means permit adjustment of the bracket at right angles to the axis of the shaft of the machine or apparatus.

3. The invention according to claim 1, wherein, for the purposes of adjustment, the bracket is provided with spaced slots at right angles to the axis of the shaft of the machine or apparatus, and wherein the securing means comprises headed bolts whereof the shanks are passed through the slots in the bracket and into the stationary member of the machine or apparatus.

4. The invention according to claim 1, wherein the connecting means comprises spaced stud projections which extend laterally from the casing of the device with their shanks fitting loosely through apertures in the bracket.

5. The invention according to claim 1, wherein the speed change device has an inter-geared input shaft axially aligned with the output shaft and extending through the opposite side of the casing, and a pulley on the protruding end of said input shaft adapted to be belt-driven from a prime mover.

6. The invention according to claim 1, wherein the connecting means comprises a semi-spherical projection at one side of the casing of the device constituting the bearing for the output shaft and fitting a semi-spherical socket opening in the bracket.

7. The invention according to claim 1, wherein the connecting means comprises a semi-spherical projection at one side of the casing of the device providing the bearing for the output shaft and fitting a semi-spherical socket opening in the bracket, said spherical projection having a radial stud which is engaged with a motion limiting slot in the bracket extending in the direction of the axis of the shaft of the machine or apparatus.

8. The invention according to claim 1, wherein the connecting means comprises a semi-spherical projection at one side of the casing of the device constituting the bearing for the output shaft and fitting a semi-spherical socket opening in the bracket; and wherein the speed change device has an inter-geared input shaft axially aligned with the input shaft and extending through the opposite side of the casing, and a pulley on said input shaft adapted to be belt-driven from a prime mover.

9. The invention according to claim 1, wherein the connecting means comprises a semi-spherical projection at one side of the casing of the device constituting the bearing for the output shaft and fitting a semi-spherical socket opening in the bracket; and wherein the bracket is formed by complemental components which abut in a transverse plane through the axis of said spherical projection.

10. A speed change transmission comprising, a driven shaft, a journal support for said driven shaft, a prime mover and a speed change device operably coupled to form a speed change unit, said speed change device having a power take-off including means to couple it rigidly about a portion of said driven shaft, a universal support for said speed change unit including, a support element, a spherical portion on said support element, a base member adapted to be secured to a foundation and adjustably engaging said spherical portion for supporting said support element, said spherical portion being coaxial with the longitudinal axis of said power take-off, and said rigidly coupled driven shaft being journalled in said support element for supporting said speed change unit so as to permit said universal support to position said speed change unit to compensate for parallel and angular mounting misalignment between said longitudinal axis and said base member.

11. A speed change transmission comprising, a driven shaft, a journal support for said driven shaft, a prime mover and a speed change device operably coupled to form a speed change unit, said speed change device having a power take-off shaft, bearing support in said speed change device for said power take-off shaft, coupling means to connect said power take-off shaft rigidly about a portion of said driven shaft, a universal self-aligning support for said speed change unit including, a support element, said support element extending from said speed change unit, a spherical portion on said support elements, a base member adapted to be secured to a foundation and adjustably engaging said spherical portion for supporting said support element, said spherical portion being coaxial with the longitudinal axis of said power take-off shaft, and said rigidly coupled driven shaft being journalled by said bearing support in said speed change device to provide said journal support.

12. A speed change transmission comprising, a driven shaft, a journal support for said driven shaft, a prime mover and a speed change device operably coupled to form a speed change unit, said speed change device having a power take-off shaft, bearing support in said speed change device for said power take-off shaft, coupling means to connect said power take-off shaft rigidly about a portion of said driven shaft, a universal self-aligning support for said speed change unit including, a support element, said support element extending from said speed change unit, a spherical portion on said support element, a base member adapted to be secured to a foundation and adjustably engaging said spherical portion for supporting said support element, said spherical portion being coaxial with the longitudinal axis of said power take-off shaft so as to permit said universal self-aligning support to position said speed change unit to compensate for parallel and angular mounting misalignment between said longitudinal axis and said base member, and said rigidly coupled driven shaft being journalled by said bearing support in said speed change device to provide said journal support.

References Cited in the file of this patent

UNITED STATES PATENTS

| | | |
|---|---|---|
| 1,979,162 | Lansing | Oct. 30, 1934 |
| 2,108,368 | Christian | Feb. 15, 1938 |
| 2,504,066 | Christian | Apr. 11, 1950 |